(No Model.)
F. J. FREESE.
WHEEL.
No. 542,678. Patented July 16, 1895.
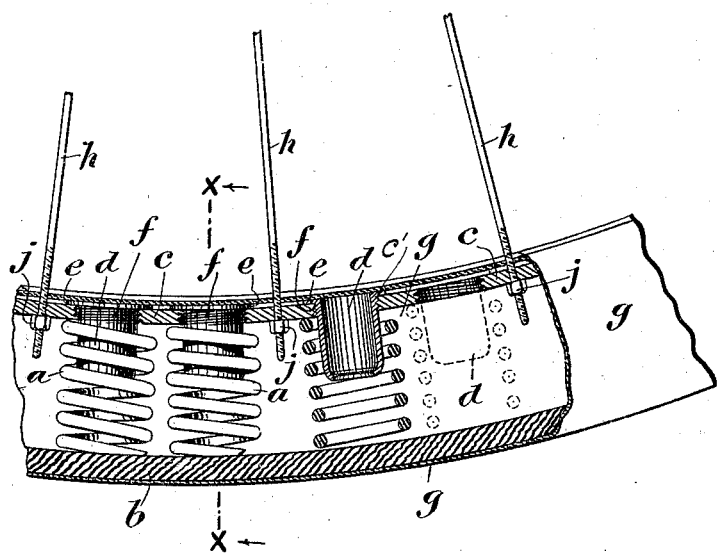
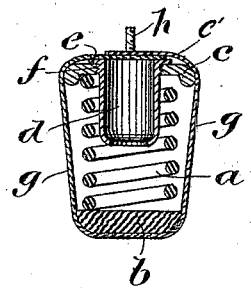
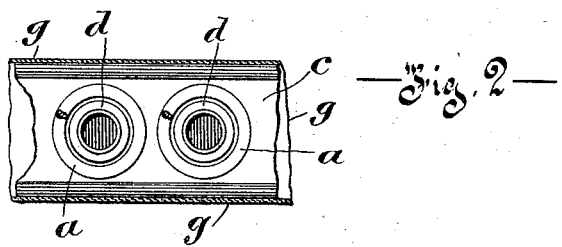
Witnesses
Inventor
Francis Joseph Freese
By his Attorney

UNITED STATES PATENT OFFICE.

FRANCIS JOSEPH FREESE, OF LOWELL, MASSACHUSETTS.

WHEEL.

SPECIFICATION forming part of Letters Patent No. 542,678, dated July 16, 1895.

Application filed October 7, 1893. Serial No. 487,441. (No model.)

*To all whom it may concern:*

Be it known that I, FRANCIS JOSEPH FREESE, of the city of Lowell, in the State of Massachusetts, and temporarily residing in the city of Montreal, in the district of Montreal and Province of Quebec, Canada, have invented certain new and useful Improvements in Wheels; and I do hereby declare that the following is a full, clear, and exact description of the same.

This invention relates to wheels having a tread cushioned by a number of independent elastic cushions, and has for its object to produce a lighter and more easily-constructed tread than those hitherto produced. For full comprehension, however, of the invention reference must be had to the annexed drawings, forming a part of this specification, in which like symbols indicate corresponding parts, and wherein—

Figure 1 is a side elevation of a portion of a bicycle-wheel, partly broken away, having a tread constructed according to my invention. Fig. 2 is a plan view of a part of the tread seen from the inner periphery side, the inclosing-casing being cut away; and Fig. 3 a transverse sectional view of the tread on line $x\,x$, Fig. 1.

The construction of my improved cushioned tread is shown as composed of an outer tire $b$, the inside surface of which is an even plane throughout, which may be of vulcanized rubber, if desired, an inner thin-metal bearing-plate $c$, perforated at $c'$ and carrying a number of tubular metal sections $d$, which are set in the perforations $c'$ and arranged radially of the wheel-axis, and a number of short coiled springs $a$, (although tubular rubber sections could be used,) encircling such tubular metal sections and being confined between said outer tire and inner bearing-plate.

The metal bearing-plate $c$, being perforated to receive the tubular metal sections $d$, and these being of thinner metal than the plate the latter is lightened by the construction and remains just as strong or is even stronger, owing to the tubular or cylindrical form of the sections.

The metal sections are preferably flanged, as at $e$, and can have a screw-threaded connection with the bearing-plate, as shown at $f$, or be simply soldered in place.

To cover up the parts I prefer to use a flexible cover-strip $g$ of rubber, which passes over the outer tire $b$, to which it is cemented, up the sides of the tread, and folded in over the inner plate $c$, where the two ends can be connected in any desired way either by cementing, as shown, lacing, or otherwise.

The connection between the spokes and the tread form no part of my invention, and I have simply shown bicycle-spokes $h$ passing through apertures formed in the inner bearing-plate and secured by nuts $j$, other forms of connection determined by different requirements being left to those skilled in the art.

What I claim is as follows:

1. A wheel tread formed of an outer continuous tire, an inner continuous metal bearing plate having circular sections of metal removed from the center thereof to form openings therein; guides in the form of sections of metal tubes formed of a less thickness of metal than said bearing plate, rigidly fitted or connected to the edges of the openings in said plates leaving the central spaces thereof open, and projecting radially outward within the tread; coiled springs arranged between said tire and plate and encircling said guide and a cover for the whole.

2. In a wheel tread, the combination of an outer continuous tire $b$, an inner continuous thin metal bearing plate $c$ having screw threaded perforations $c'$ therein; tubular metallic sections $d$ screw threaded to take into said screw threaded perforations and adapted to project radially outward of the wheel axis into the space between said tire and bearing plate; coiled springs $a$ encircling said tubular metallic sections and having their ends bearing upon both tire and bearing plate and a cover $g$ for the whole as set forth.

FRANCIS JOSEPH FREESE.

In presence of—
WILL P. McFEAT,
FRED. J. SEARS.